(12) United States Patent
Lu

(10) Patent No.: US 11,111,695 B2
(45) Date of Patent: Sep. 7, 2021

(54) ELECTRONIC LOCK AND USE THEREOF

(71) Applicant: Zhejiang Okai Vehicle Co., Ltd., Lishui (CN)

(72) Inventor: Jiangtao Lu, Lishui (CN)

(73) Assignee: Zhejiang Okai Vehicle Co., Ltd., Lishui (CN)

( * ) Notice: Subject to any disclaimer, the term of this patent is extended or adjusted under 35 U.S.C. 154(b) by 349 days.

(21) Appl. No.: 16/290,465

(22) Filed: Mar. 1, 2019

(65) Prior Publication Data

US 2020/0277807 A1 Sep. 3, 2020

(51) Int. Cl.
| | |
|---|---|
| E05B 47/00 | (2006.01) |
| B62J 45/40 | (2020.01) |
| B62H 5/00 | (2006.01) |
| E05B 71/00 | (2006.01) |
| E05B 73/00 | (2006.01) |

(52) U.S. Cl.
CPC .. *E05B 47/0012* (2013.01); *E05B 2047/0048* (2013.01); *E05B 2047/0084* (2013.01)

(58) Field of Classification Search
CPC ......... E05B 47/0012; E05B 2047/0084; E05B 2047/0048; E05B 71/00; E05B 73/0011; E05B 73/0005; B62J 45/40; B62H 5/003
USPC ...... 70/14, 18, 30, 49, 58, 233, 278.7, 279.1
See application file for complete search history.

(56) References Cited

U.S. PATENT DOCUMENTS

| | | | | | |
|---|---|---|---|---|---|
| 3,993,987 | A | * | 11/1976 | Stevens | E05B 45/005 340/542 |
| 4,033,160 | A | * | 7/1977 | Mima | B62H 5/003 70/233 |
| 4,845,967 | A | * | 7/1989 | Evans | B62H 5/003 70/233 |
| 5,561,996 | A | * | 10/1996 | Chang | B60R 25/066 70/247 |
| 5,836,002 | A | * | 11/1998 | Morstein | B62H 5/00 340/568.1 |
| 6,681,603 | B1 | * | 1/2004 | Yu | E05B 67/006 30/233 |
| 6,731,212 | B2 | * | 5/2004 | Hirose | E05B 45/005 340/572.1 |
| 6,761,051 | B1 | * | 7/2004 | Tsai | E05B 47/0012 70/257 |
| 7,233,245 | B2 | * | 6/2007 | O'Neill | B60R 25/102 224/412 |
| 7,246,511 | B1 | * | 7/2007 | Zhu | E05B 67/003 42/70.11 |
| 7,428,833 | B2 | * | 9/2008 | Tollefson | B60D 1/60 70/14 |
| 8,065,895 | B2 | * | 11/2011 | Andersen | G07B 15/00 70/14 |

(Continued)

*Primary Examiner* — Lloyd A Gall
(74) *Attorney, Agent, or Firm* — Schwegman Lundberg & Woessner, P.A.

(57) ABSTRACT

An electronic lock includes a lock shell, a rope winded disc, a lock rope head, a sliding lock block, and a controlling and driving device. The lock shell has a first lock hole and an insertion hole. A lock rope is winded at the rope winded disc, and the lock rope is operatively pulled out from the rope winded disc or returns inside the rope winded disc. The lock rope head is inserted into the insertion hole and connected with one end of the lock rope. The sliding lock block is disposed inside the lock shell through a spring, and one end of the sliding lock block is placed in the first lock hole.

17 Claims, 3 Drawing Sheets

(56) References Cited

U.S. PATENT DOCUMENTS

| | | | | |
|---|---|---|---|---|
| 8,225,629 | B2* | 7/2012 | Zuraski | E05B 67/003 |
| | | | | 70/21 |
| 8,353,187 | B2* | 1/2013 | Woodling | E05B 47/0603 |
| | | | | 70/278.7 |
| 9,523,218 | B1* | 12/2016 | McGraw | E05B 73/0011 |
| 10,577,834 | B1* | 3/2020 | Luedtke | B62H 5/003 |
| 10,689,046 | B1* | 6/2020 | Luedtke | B62H 5/20 |
| 10,774,566 | B2* | 9/2020 | Long | G07C 9/00563 |
| 2008/0018440 | A1* | 1/2008 | Aulbers | B62H 5/003 |
| | | | | 340/432 |
| 2010/0052907 | A1* | 3/2010 | Shannon | B62H 5/20 |
| | | | | 340/568.6 |
| 2011/0265526 | A1* | 11/2011 | Zuraski | E05B 67/003 |
| | | | | 70/18 |
| 2013/0032619 | A1* | 2/2013 | Lang | B60R 9/10 |
| | | | | 224/315 |
| 2015/0020558 | A1* | 1/2015 | Williams | G01S 19/16 |
| | | | | 70/18 |
| 2016/0059918 | A1* | 3/2016 | Hensley | B62M 3/08 |
| | | | | 70/233 |
| 2017/0116805 | A1* | 4/2017 | Neupert | B60L 53/30 |
| 2017/0198497 | A1* | 7/2017 | Tsai | G07C 9/00563 |
| 2018/0096549 | A1* | 4/2018 | Tseng | G07C 9/00817 |

\* cited by examiner

ELECTRONIC LOCK AND USE THEREOF

BACKGROUND OF THE INVENTION

Field of the Invention

This invention relates to an electronic lock, and more particularly, to an electronic lock applicable to a shared scooter. In addition, this invention further provides a use of the electronic lock on a shared vehicle, especially the shared scooter.

Description of the Related Art

With the prevalence of the shared mode, a shared bicycle, a shared scooter, a shared electric vehicle and other shared vehicles are very common in cities. At present, the locking way of the shared vehicles is very simple, and a vehicle lock has only two functions: unlocking and locking. After the vehicle lock is unlocked, a user can use the shared vehicle, and it starts timing and charging. One drawback of this vehicle lock is that it does not have the function to merely lock the vehicle without ending the trip, that is, the lock does not have the function to stop for a short time. During usage, if the user needs to stop riding in the middle of a trip and leave for a few minutes, considering that if the user leaves the vehicle without locking the vehicle, the vehicle may be ridden by others. Therefore the user can only lock the vehicle to end this trip, and it starts timing and charging again when the user comes back. If the vehicle is ridden by others during the period of leaving, the user has to find other available vehicles, which will be relative troublesome and take time to find other vehicles, resulting in poor user experience. All in all, the existing shared vehicle cannot meet the requirement that the user leaves for a short time in the middle of the trip and does not want to return the vehicle. How to solve this problem and make the use of the shared vehicle more humanized is a topic we need to discuss.

BRIEF SUMMARY OF THE INVENTION

The objective of this invention is to provide an electronic lock and a use thereof, which solves the problem that the existing shared vehicle cannot only be locked without ending the trip.

To solve the above-mentioned problem, this invention provides an electronic lock, and the electronic lock includes a lock shell, a rope winded disc, a lock rope head, a sliding lock block, and a controlling and driving device. The lock shell has a first lock hole and an insertion hole. The rope winded disc is disposed inside the lock shell, a lock rope is winded at the rope winded disc, and the lock rope is operatively pulled out from the rope winded disc or returns inside the rope winded disc. The lock rope head is inserted into the insertion hole and connected with one end of the lock rope. The sliding lock block is disposed inside the lock shell through a spring, and one end of the sliding lock block is placed in the first lock hole. The controlling and driving device is disposed inside the lock shell. When locking is required, a user pulls out the lock rope head from the insertion hole, the lock rope head is inserted into the first lock hole after the lock rope is pulled out from the rope winded disc, and the sliding lock block locks the lock rope head. When unlocking is required, the controlling and driving device drives the sliding lock block to slide in an opposite direction, the user pulls out the lock rope head from the first lock hole, and the sliding lock block returns to an original position through the spring.

According to an embodiment of this invention, the controlling and driving device may include a sensor, a printed circuit board, and a motor. The sensor may be disposed inside the lock shell. The printed circuit board may be disposed inside the lock shell and electrically connected with the sensor. The motor may be disposed inside the lock shell and electrically connected with the printed circuit board. During usage, when the lock rope head is inserted into the first lock hole, the sensor may detect that the lock rope head is locked and may feed back a result. When the printed circuit board receives an unlock instruction, the printed circuit board may control the motor such that the motor drives the sliding lock block to slide in the opposite direction for unlocking.

According to one embodiment of this invention, the controlling and driving device may further include a pin and a spring. One end of the pin may be located in the first lock hole, the spring may be disposed inside the lock shell and may abut against the pin such that the pin and the sensor keep in contact, and the sensor may detect whether the lock rope head is inserted into the first lock hole.

According to one embodiment of this invention, the controlling and driving device may further include a cam. The cam may be installed at an output shaft of the motor, the cam may have a spiral sliding surface taking the output shaft of the motor as a center, and one end of the sliding lock block may abut against the sliding surface of the cam.

According to one embodiment of this invention, the cam may have two first limiting blocks spaced apart, the lock shell may have two second limiting blocks spaced apart, and the motor may stop rotating when the motor rotates to a position where one of the first limiting blocks is stuck into one of the second limiting blocks.

According to one embodiment of this invention, the rope winded disc may have a winding mechanism arranged in a spiral way, the lock rope may be winded along the winding mechanism in the spiral way, and the lock rope may automatically return inside the rope winded disc under action of the winding mechanism when the lock rope head is pulled out from the first lock hole.

According to one embodiment of this invention, a side wall of one end of the lock rope head may form an annular depression, and one end of the sliding lock block may fasten the depression of the lock rope head thereby locking the lock rope head when the lock rope head is inserted into the first lock hole.

According to one embodiment of this invention, the electronic lock may include a key, the lock shell may have a first keyhole, and the key may drive the sliding lock block to slide thereby unlocking the lock rope head when the key is inserted into the first keyhole and the key works.

According to another aspect of this invention, this invention further provides a use of the above-mentioned electronic lock, and the electronic lock is applied to a shared vehicle.

According to one embodiment of this invention, the electronic lock is applied to a shared electric scooter, and the shared electric scooter has a controller, a positioning tracker, and a front straight rod. The electronic lock is installed at the front straight rod, the controlling and driving device is electrically connected with the controller, the positioning tracker and the controller are electrically connected, the positioning tracker and a management platform are communicatively connected, and the user is communicatively connected with the management platform through APP. When the locking is required, the lock rope head is inserted into the first lock hole, the sensor detects that the lock rope head is locked and feeds back the result to the controller through the printed circuit board, and the controller controls the shared electric scooter to be in a locking state. When the unlocking is required, the user operates App to send the unlocking instruction to the management platform, the management platform sends the unlocking instruction to the controller through the positioning tracker, and the controller indirectly controls the motor to drive by controlling the printed circuit board, thereby achieving unlocking.

Compared with the prior art, this technical solution has the following advantages.

In this invention, the rope winded disc enables the lock rope to be operatively pulled out from the rope winded disc or return back inside the rope winded disc. One end of the lock rope is connected with the lock rope head, the user can pull out the lock rope head from the insertion hole and pulls out the lock rope from the rope winded disc, and finally the lock rope head is inserted into the first lock hole and is locked such that the lock rope head cannot be pulled out. The electronic lock can be applied to shared vehicles, such as a shared bicycle, a shared scooter, or a shared electric vehicle. The electronic lock is added to the shared vehicle, and the electronic lock does not affect the charging for the vehicle lock of the shared vehicle. The electronic lock and the vehicle lock are independently used and connected with the management platform system through APP of the user to send, receive and execute the instruction. In this way, when the user needs to leave in the middle of the riding trip, the vehicle lock of the shared vehicle does not need to be locked, and the previous riding trip does not need to be ended. Instead, the electronic lock can be used to lock the shared vehicle for a short time, such that the shared vehicle will not be ridden by others. When the user comes back, the electronic lock can be unlocked through APP of the user, thereby continue using the shared vehicle. The user does not need to find another vehicle, there is no need to scan the quick response code again to unlock the lock, and the timing and charging of the entire riding trip will not be stopped. This invention solves the problem that the conventional shared vehicle cannot stop for a short time in the middle of the riding trip and the vehicle lock cannot be locked without ending the trip, such that the using function of the shared vehicle is more humanized, which avoids the trouble of finding another vehicle when the user leaves for a short time and greatly improves the user's experience.

In this invention, by disposing the sensor, the printed circuit board, and the motor, automatic locking and unlocking of the electronic lock is achieved. After locking, the shared vehicle cannot be ridden by others, and the operation is simple, convenient and fast.

In this invention, by disposing two first limiting blocks at the cam and correspondingly disposing two second limiting blocks at the lock shell, the maximum angle range in which the cam rotates toward two directions is limited. When the cam rotates to a position where one of the first limiting blocks is stuck into one of the second limiting blocks, the cam cannot continue to rotate such that the motor stops driving.

In this invention, by disposing the winding mechanism at the rope winded disc, the lock rope can automatically return inside the rope winded disc. When the user does not need to use the electronic lock or the electronic lock is unlocked, the lock rope head can be inserted back into the insertion hole, and the lock rope automatically returns inside the rope winded disc under the action of the winding mechanism when the lock rope is no longer subject to external force. It not only protects the lock rope but also makes the electronic lock be relative beautiful during usage.

In this invention, by additionally disposing the key, another way for the management staff to open the electronic lock is provided. When the electronic lock fails to be opened or needs to be repaired, the management staff or the maintenance staff can use the key to open the electronic lock.

DETAILED DESCRIPTION OF THE INVENTION

Figure 1:
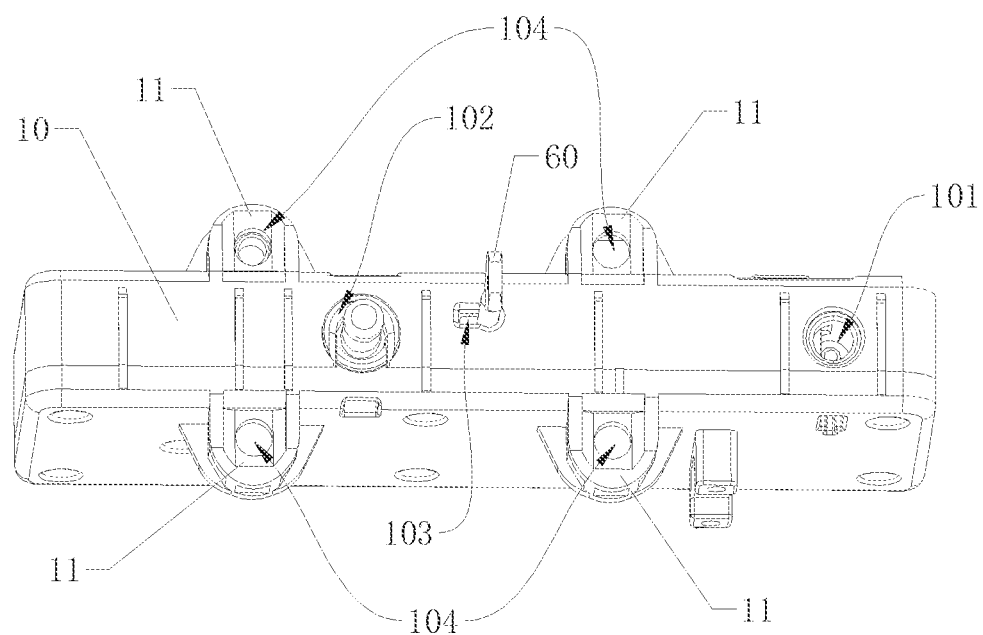
FIG. 1 is a schematic diagram of a three-dimensional structure of an electronic lock provided by this invention.
Figure 2:
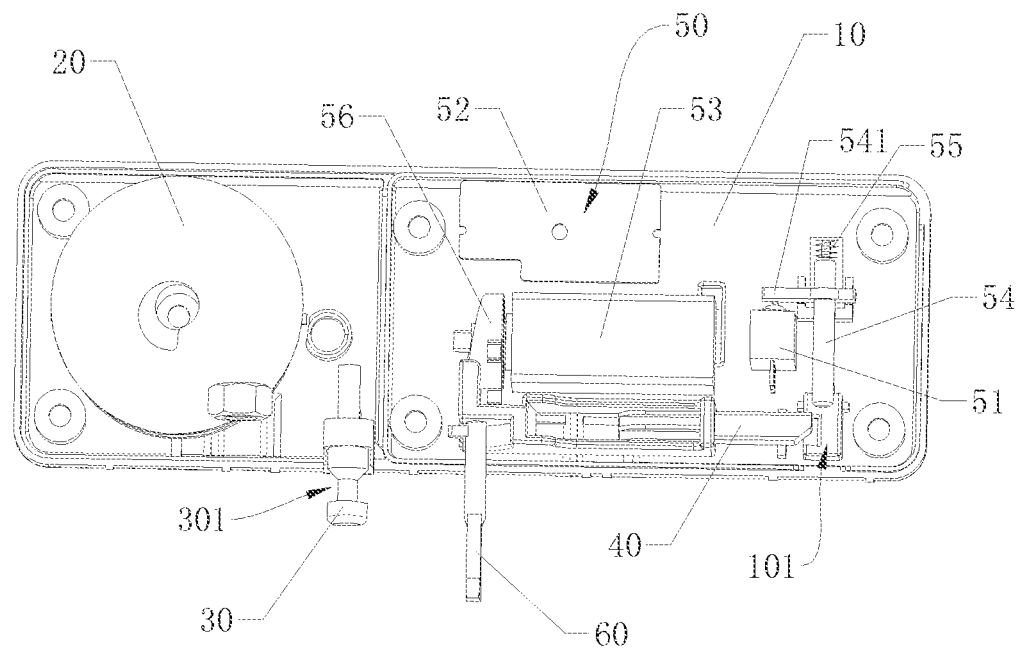
FIG. 2 is a schematic diagram of an internal structure of the electronic lock provided by this invention.
Figure 3:
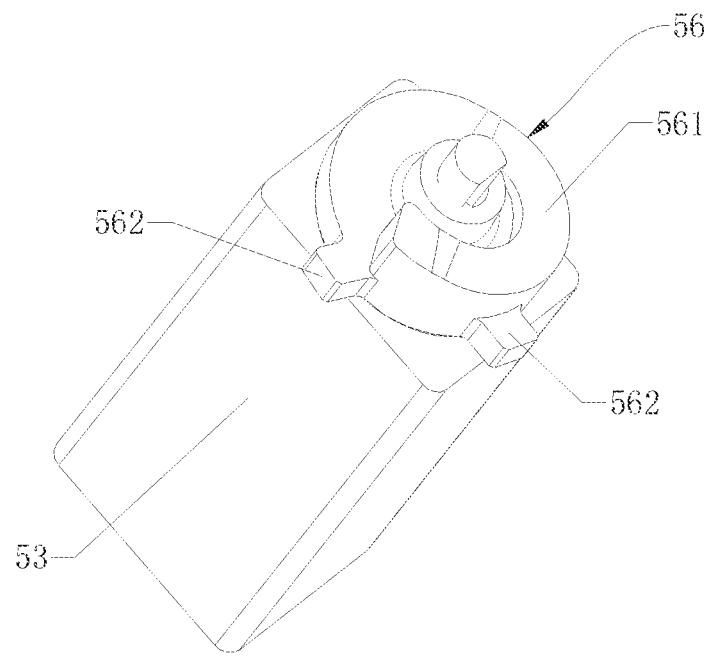
FIG. 3 is schematic diagram of a three-dimensional structure of a motor and a cam of the electronic lock provided by this invention.
Figure 4:
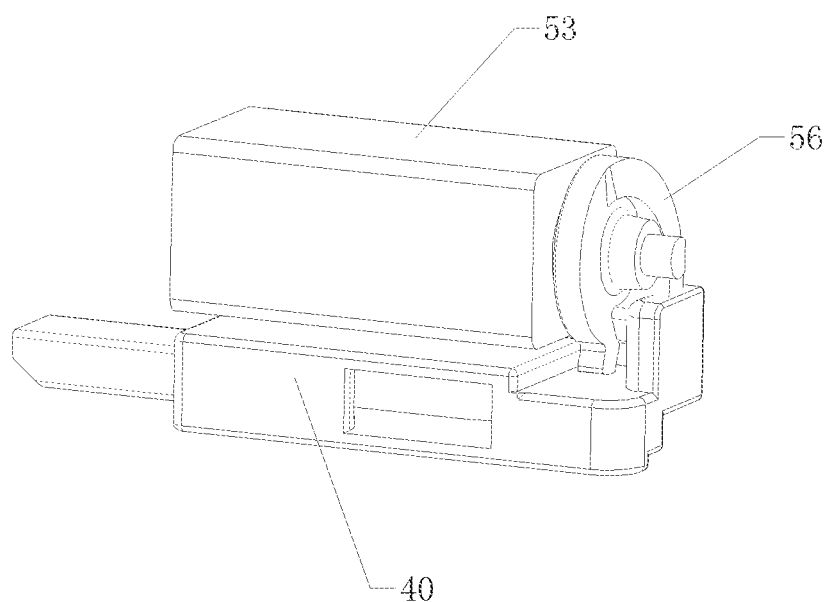
FIG. 4 shows an installation and cooperation relationship among the motor, the cam, and a sliding lock block of the electronic lock provided by this invention.
Figure 5:
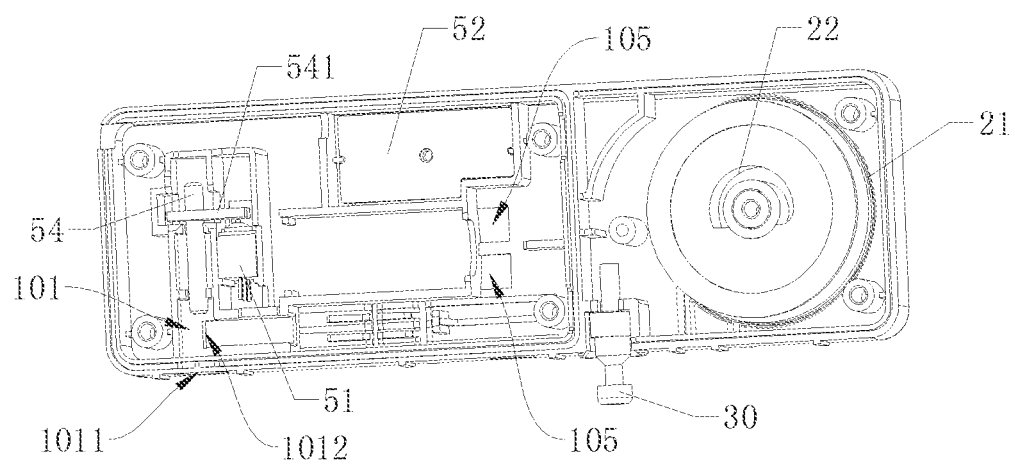
FIG. 5 is a schematic diagram of the internal structure of the electronic lock provided by this invention in a case of omitting the motor, showing two second limiting blocks of a lock shell.

The following description is only for explaining this invention such that those skilled in the art can implement this invention. Embodiments described below are only examples, and those skilled in the art will think of other obvious variations. The basic principle of this invention defined in the following description can be applied to other implementation solutions, variation solutions, improvement solutions, equivalent solutions, and other solutions without departing from the spirit and scope of this invention.

The invention provides an electronic lock, and more particularly, to an electronic lock applied to a shared vehicle. For example, the electronic lock can be applied to a shared bicycle, a shared scooter, or a shared electric vehicle. The electronic lock can be used to lock the shared vehicle separately without affecting the use of an original vehicle lock of the shared vehicle, thereby locking the shared vehicle without ending a riding trip and re-charging. Specifically, the electronic lock comprises a lock shell 10, a rope winded disc 20, a lock rope head 30, a sliding lock block 40, and a controlling and driving device 50.

The lock shell 10 is a cuboid shape with a cavity inside. The lock shell 10 has a first lock hole 101 and an insertion hole 102. A hole passage of the first lock hole 101 has a predetermined length, and the first lock hole 101 has a first opening 1011 and a second opening 1012. The first lock hole 101 communicates with an outside of the lock shell 10 through the first opening 1011, and the first lock hole 101 communicates with the cavity inside the lock shell 10 through the second opening 1012. The insertion hole 102 is a through hole communicating with the cavity inside the lock shell 10.

Further, the lock shell 10 has a first keyhole 103 and a plurality of second threaded holes 104. The first keyhole 103 communicates with the cavity inside the lock shell 10. Optionally, in this embodiment, in order to simplify the structure, the first lock hole 101, the insertion hole 102, and the first keyhole 103 are all located at the same side of the lock shell 10 and are spaced apart. The second threaded holes 104 are used for installation and fixation of the electronic lock, that is, the electronic lock is installed at a target position through the second threaded holes 104 in application. Optionally, outer walls of the lock shell 10 have four protruding installation portions 11. The number of second threaded holes 104 is four, and all second threaded holes 104 are blind holes. Four threaded holes 104 are correspondingly distributed at four installation portions 11. In addition, the lock shell 10 also has two second limiting blocks 105 spaced apart.

The rope winded disc 20 is disposed inside the lock shell 10, and a lock rope 21 is winded at the rope winded disc 20. The rope winded disc 20 has a winding mechanism 22 arranged in a spiral way, and the lock rope 21 is winded along the winding mechanism 22 in the spiral way.

The lock rope head 30 is inserted into the insertion hole 102 and connected with one end of the lock rope 21. Specifically, one end of the lock rope 21 is connected with the lock rope head 30 through the insertion hole 102.

A side wall of the other end of the lock rope head 30 forms an annular depression 301. When the lock rope head 30 is pulled out such that the lock rope 21 is pulled out, the lock rope 21 is pulled out from the rope winded disc 20; and when the lock rope head 30 is inserted back into the insertion hole 102, as pulling force acting on the lock rope 21 is withdrawn, the lock rope 21 automatically returns inside the rope winded disc 20 under the action of the winding mechanism 22. In other words, the lock rope 21 is operatively pulled out from the rope winded disc 20 or returns inside the rope winded disc 20.

The sliding lock block 40 is a long strip, and the sliding lock block 40 is slidably disposed inside the lock shell 10 through a spring and is located in a position corresponding to the first keyhole 103. Specifically, an inner wall of the lock shell 10 has an installation groove, the spring is placed in the installation groove of the lock shell 10, and one end of the spring is against the inner wall of the installation groove. The sliding lock block 40 is arranged in a position corresponding to the installation groove of the lock shell 10, and the other end of the spring is against the sliding lock block 40. One end of the sliding lock block 40 is placed in the first lock hole 101 through the second opening 1012. When the lock rope head 30 is inserted into the first lock hole 101, one end of the sliding lock block 40 fastens the depression 301 of the lock rope head 30 thereby locking the lock rope head 30, and the lock rope head 30 cannot be pulled out from the first lock hole 101.

The controlling and driving device 50 is disposed inside the lock shell 10 and is configured to control and drive the sliding lock block 40 to slide, thereby realizing locking and unlocking of the electronic lock. Specifically, the controlling and driving device 50 is connected with a management platform of the shared vehicle in a communication way through an APP of a user, that is, the user can operate the APP and send or receive an instruction to the controlling and driving device through the management platform of the shared vehicle. When the locking is required, the user pulls out the lock rope head 30 from the insertion hole 102, and the lock rope head 30 is inserted into the first lock hole 101 after the lock rope 21 is pulled out from the rope winded disc 20. The sliding lock block 40 locks the lock rope head 30. When the unlocking is required, the controlling and driving device 50 drives the sliding lock block 40 to slide in an opposite position. At this time, the sliding lock block 40 no longer locks the lock rope head 30, and the user pulls out the lock rope head 30 from the first lock hole 101. After the lock rope head 30 is pulled out from the first lock hole 101, the lock rope 21 automatically returns inside the rope winded disc 20 under the action of the winding mechanism 22, and the sliding lock block 40 returns to the original position through the spring.

Further, the controlling and driving device 50 includes a sensor 51, a printed circuit board 52, and a motor 53. The sensor 51 is disposed inside the lock shell 10 and is used to automatically detect whether lock rope head 30 is inserted into the first lock hole 101.

Further, the controlling and driving device 50 includes a pin 54 and a spring 55. The pin 54 is disposed inside the lock shell 10, and one end of the pin 54 is located in the first lock hole 101. The pin 54 also has a contacting plate 541. The spring 55 is disposed at the lock shell 10, and one side of the spring 55 is sleeved on the pin 54 to against the pin 54, such that the contacting plate 541 of the pin 54 and the sensor 51 are always in contact. The sensor 51 detects whether the lock rope head 30 is inserted into the first lock hole 101 through the pin 54.

The printed circuit board 52 is disposed inside the lock shell 10 and is electrically connected with the sensor 51. The motor 53 is disposed inside the lock shell 101 and is electrically connected with the printed circuit board 52. During usage, when the lock rope head 30 is inserted into the first lock hole 101, the sensor 51 detects that the lock rope head 30 is locked and then feeds back a result; and when the printed circuit board 52 receives an unlocking instruction, the printed circuit board 52 controls the motor 53 such that the motor 53 drives the sliding lock block 40 to slide in the opposite direction for unlocking.

Further, the controlling and driving device 50 includes a cam 56, and the cam 56 is installed at an output shaft of the motor 53. The cam 56 has a spiral sliding surface 561 taking the output shaft of the motor 53 as a center, and one end of the sliding lock block 40 abuts against the sliding surface 561 of the cam 56. The motor 53 drives the sliding lock block 40 to slide through the cam 56. When the output shaft of the motor 53 rotates, the motor 53 drives the cam 56 to rotate, and the cam 56 drives the sliding lock block 40 to slide along the sliding surface 561 of the cam 56. Since the sliding surface 561 is spiral, the sliding lock block 40 will slide in a straight line inside the lock shell 10.

The cam 56 also has two first limiting blocks 562 spaced apart, and the cam 56 is installed at a position corresponding to the two second limiting blocks 105 of the lock shell 10. When the motor 53 rotates to a position where one of the first limiting blocks 562 is stuck in one of the second limiting blocks 105, the motor 53 stops driving, and the cam 56 cannot continue to rotate. That is, through the two first limiting blocks 562 of the cam 56, a maximum angle range of the cam 56 toward two directions can be limited, respectively. The cam 56 can only be allowed to rotate to the position where one of the first limiting blocks 562 is stuck in one of the second limiting blocks 105.

The electronic lock also includes a key 60, and the key 60 is used to unlock the electronic lock in a fault condition. When the key 60 is inserted into the first keyhole 103 and the key 60 is operated, the key 60 contacts and drives the sliding lock block 40 to slide thereby unlocking the lock rope head 30, such that the electronic lock is unlocked. In a practical application, the key 60 is separately prepared for a management staff or a maintenance staff, and an ordinary user of the electronic lock does not need to prepare the key 60.

Figure 6:
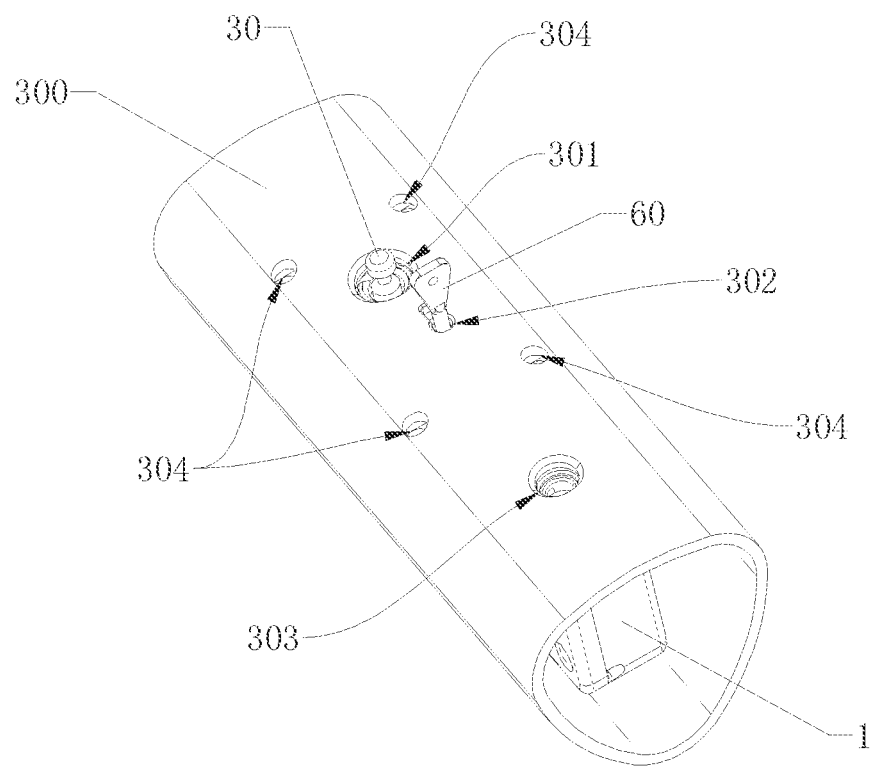
FIG. 6 is a use scenario of the electronic lock provided by this invention, showing an installation way between the electronic lock and a front straight rod of a shared scooter.

The electronic lock provided by this invention can be applied to the shared vehicle, such as the shared bicycle, the shared scooter, the shared electric vehicle and so on. The use of the electronic lock is described by taking the electronic lock applied to a shared electric scooter as an example. As shown in FIG. 6, the shared electric scooter has a controller, a positioning tracker, and a front straight rod 300, and the electronic lock is installed at the front straight rod 300. In a practical application, in order to make the appearance of the shared electric scooter be relative beautiful, a hollow front straight rod 300 is adopted, and the electronic lock is installed inside the front straight rod 300 in a hidden way.

Specifically, a side wall of the front straight rod 300 has a rope out hole 301, a second keyhole 302, a second lock hole 303, and a plurality of first threaded holes 304 for installing the electronic lock. The electronic lock is installed inside the front straight rod 300, and the first threaded holes 304 correspond to the second threaded holes 104 one-to-one. The electronic lock is fixed at the front straight rod 300 through a screw, and each of the screws correspondingly passes through one first threaded hole 304 and one second threaded hole 104, thereby hiding the electronic lock inside the front straight rod 300, such that the electronic lock does not occupy additional space and does not affect the appearance of the front straight rod 300. After the electronic lock is installed at the front straight rod 300, the lock rope head 30 is exposed outside the front straight rod 300 through the rope out hole 301, and the first lock hole 101 correspondingly communicates with the second lock hole 303, thereby facilitating insertion or pull-out of the lock rope head 30. The first keyhole 103 correspondingly communicates with the second keyhole 302, thereby facilitating the insertion or pull-out of the key 60.

The controlling and driving device 50 is electrically connected with the controller of the shared electric scooter, the positioning tracker of the shared electric scooter and the controller of the shared electric scooter are electrically connected, the positioning tracker of the shared electric scooter and the management platform are communicatively connected, and the user is communicatively connected with the management platform through the APP. When the locking is required, after the lock rope head 30 is inserted into the first lock hole 101, the sensor 51 detects that the lock rope head 30 is locked and feeds back the result to the controller of the shared electric scooter through the printed circuit board 52, and the controller of the shared electric scooter controls the shared electric scooter to be in a locking state. When the unlocking is required, the user operates the App to send the unlocking instruction to the management platform. The management platform sends the unlocking instruction to the controller of the shared electric scooter through the positioning tracker, and the controller of the shared electric scooter indirectly controls the motor 53 to drive by controlling the printed circuit board 52, thereby achieving unlocking.

As another use, the electronic lock can also be applied to the shared bicycle. Similarly, the shared bicycle has the controller and the positioning tracker, and the controlling and driving device 50 is electrically connected with the controller of the shared bicycle. The positioning tracker of the shared bicycle and the controller of the shared bicycle are electrically connected, the positioning tracker of the shared bicycle and the management platform are communicatively connected, and the user is communicatively connected with the management platform through the APP. During usage, when the locking is required, the user first pulls out the lock rope head 30 from the insertion hole 102, and the lock rope 21 is pulled out from the rope winded disc 20 and is winded at a fixture, for example, a tree. Then the lock rope head 30 is inserted into the first lock hole 101, and the sliding lock block 40 locks the lock rope head 30. In this way, the shared bicycle is bound with the fixture through the lock rope 21 of the electronic lock and cannot be ridden by others. When the unlocking is required, the user operates the App to send the unlocking instruction to the management platform. The management platform sends the unlocking instruction to the controller of the shared bicycle through the positioning tracker, and the controller of the shared bicycle indirectly controls the motor 53 to drive by controlling the printed circuit board 52, thereby achieving unlocking.

The electronic lock is added to the shared vehicle, and the electronic lock does not affect the charging for the vehicle lock of the shared vehicle. The electronic lock and the vehicle lock are independently used and connected with the management platform system through APP of the user to send, receive and execute the instruction. In this way, when the user needs to leave in the middle of the riding trip, the vehicle lock of the shared vehicle does not need to be locked, and the previous riding trip does not need to be ended. Instead, the electronic lock can be used to lock the shared vehicle for a short time, such that the shared vehicle will not be ridden by others. When the user comes back, the electronic lock can be unlocked through APP of the user, thereby continue using the shared vehicle. The user does not need to find another vehicle, there is no need to scan the quick response code again to unlock the lock, and the timing and charging of the entire riding trip will not be stopped. This invention solves the problem that the conventional shared vehicle cannot stop for a short time in the middle of the riding trip and the vehicle lock cannot be locked without ending the trip, such that the using function of the shared vehicle is more humanized, which avoids the trouble of finding another vehicle when the user leaves for a short time and greatly improves the user's experience.

It should be understood by those skilled in the art that the above-mentioned description and embodiments of this invention shown in the accompany drawings are only examples and do not limit this invention. The objective of this invention has been fully and effectively realized. The function and structural principle of this invention have been shown and explained in the embodiments, and there may be any variations and modifications for implementing this invention without departing from the principle.

What is claimed is:

1. An electronic lock comprising:
   a lock shell, having a first lock hole and an insertion hole;
   a rope winded disc, disposed inside the lock shell, wherein a lock rope is winded at the rope winded disc, and the lock rope is operatively pulled out from the rope winded disc or returns inside the rope winded disc;
   a lock rope head, inserted into the insertion hole and connected with one end of the lock rope;
   a sliding lock block, disposed inside the lock shell through a spring, wherein one end of the sliding lock block is placed in the first lock hole; and
   a controlling and driving device, disposed inside the lock shell, wherein when locking is required, a user pulls out the lock rope head from the insertion hole, the lock rope head is inserted into the first lock hole after the lock rope is pulled out from the rope winded disc, and the sliding lock block locks the lock rope head; and
   when unlocking is required, the controlling and driving device drives the sliding lock block to slide in an opposite direction, the user pulls out the lock rope head from the first lock hole, and the sliding lock block returns to an original position through the spring;

wherein the controlling and driving device comprising:

a sensor, disposed inside the lock shell;

a printed circuit board, disposed inside the lock shell and electrically connected with the sensor; and a motor, disposed inside the lock shell and electrically connected with the printed circuit board, wherein during usage, when the lock rope head is inserted into the first lock hole, the sensor detects that the lock rope head is locked and feeds back a result; and when the printed circuit board receives an unlock instruction, the printed circuit board controls the motor such that the motor drives the sliding lock block to slide in the opposite direction for unlocking.

2. The electronic lock according to claim 1, wherein the controlling and driving device further comprises a pin and a spring, one end of the pin is located in the first lock hole, the spring is disposed inside the lock shell and abuts against the pin such that the pin and the sensor keep in contact, and the sensor detects whether the lock rope head is inserted into the first lock hole.

3. The electronic lock according to claim 1, wherein the controlling and driving device further comprises a cam, the cam is installed at an output shaft of the motor, the cam has a spiral sliding surface taking the output shaft of the motor as a center, and one end of the sliding lock block abuts against the sliding surface of the cam.

4. The electronic lock according to claim 2, wherein the controlling and driving device further comprises a cam, the cam is installed at an output shaft of the motor, the cam has a spiral sliding surface taking the output shaft of the motor as a center, and one end of the sliding lock block abuts against the sliding surface of the cam.

5. The electronic lock according to claim 3, wherein the cam has two first limiting blocks spaced apart, the lock shell has two second limiting blocks spaced apart, and the motor stops rotating when the motor rotates to a position where one of the first limiting blocks is stuck into one of the second limiting blocks.

6. The electronic lock according to claim 4, wherein the cam has two first limiting blocks spaced apart, the lock shell has two second limiting blocks spaced apart, and the motor stops rotating when the motor rotates to a position where one of the first limiting blocks is stuck into one of the second limiting blocks.

7. The electronic lock according to claim 1, wherein the rope winded disc has a winding mechanism comprising a spiral spring for biasing the disc, the lock rope is winded along the winding mechanism, and the lock rope automatically returns inside the rope winded disc under action of the winding mechanism when the lock rope head is pulled out from the first lock hole.

8. The electronic lock according to claim 1, wherein the rope winded disc has a winding mechanism comprising a spiral spring for biasing the disc, the lock rope is winded along the winding mechanism, and the lock rope automatically returns inside the rope winded disc under action of the winding mechanism when the lock rope head is pulled out from the first lock hole.

9. The electronic lock according to claim 2, wherein the rope winded disc has a winding mechanism comprising a spiral spring for biasing the disc, the lock rope is winded along the winding mechanism, and the lock rope automatically returns inside the rope winded disc under action of the winding mechanism when the lock rope head is pulled out from the first lock hole.

10. The electronic lock according to claim 1, wherein a side wall of one end of the lock rope head forms an annular depression, and one end of the sliding lock block fastens the depression of the lock rope head thereby locking the lock rope head when the lock rope head is inserted into the first lock hole.

11. The electronic lock according to claim 1, wherein a side wall of one end of the lock rope head forms an annular depression, and one end of the sliding lock block fastens the depression of the lock rope head thereby locking the lock rope head when the lock rope head is inserted into the first lock hole.

12. The electronic lock according to claim 2, wherein a side wall of one end of the lock rope head forms an annular depression, and one end of the sliding lock block fastens the depression of the lock rope head thereby locking the lock rope head when the lock rope head is inserted into the first lock hole.

13. The electronic lock according to claim 1, wherein the electronic lock comprises a key, the lock shell has a first keyhole, and the key drives the sliding lock block to slide thereby unlocking the lock rope head when the key is inserted into the first keyhole and the key works.

14. The electronic lock according to claim 1, wherein the electronic lock comprises a key, the lock shell has a first keyhole, and the key drives the sliding lock block to slide thereby unlocking the lock rope head when the key is inserted into the first keyhole and the key works.

15. The electronic lock according to claim 2, wherein the electronic lock comprises a key, the lock shell has a first keyhole, and the key drives the sliding lock block to slide thereby unlocking the lock rope head when the key is inserted into the first keyhole and the key works.

16. A use of the electronic lock as claimed in claim 1, wherein the electronic lock is applied to a shared vehicle.

17. A use of the electronic lock as claimed in claim 1, wherein the electronic lock is applied to a shared electric scooter, the shared electric scooter has a controller, a positioning tracker, and a front straight rod, the electronic lock is installed at the front straight rod, the controlling and driving device is electrically connected with the controller, the positioning tracker and the controller are electrically connected, the positioning tracker and a management platform are communicatively connected, and the user is communicatively connected with the management platform through APP; when the locking is required, the lock rope head is inserted into the first lock hole, the sensor detects that the lock rope head is locked and feeds back the result to the controller through the printed circuit board, and the controller controls the shared electric scooter to be in a locking state; and when the unlocking is required, the user operates App to send the unlocking instruction to the management platform, the management platform sends the unlocking instruction to the controller through the positioning tracker, and the controller indirectly controls the motor to drive by controlling the printed circuit board, thereby achieving unlocking.

\* \* \* \* \*